United States Patent [19]

Hickling et al.

[11] Patent Number: 5,085,133
[45] Date of Patent: Feb. 4, 1992

[54] EXHAUST EXTRACTION SYSTEM FOR WELDING SITE

[75] Inventors: Paul D. Hickling; Michael S. Belchos, both of Scarborough, Canada

[73] Assignee: Diesel Equipment Limited, Toronto, Canada

[21] Appl. No.: 604,167

[22] Filed: Oct. 29, 1990

[51] Int. Cl.$^5$ .............................. F23J 11/00
[52] U.S. Cl. ........................... 454/63; 454/62
[58] Field of Search ............... 98/115.1, 115.4

[56] References Cited

U.S. PATENT DOCUMENTS 3,616,745 11/1971 Russell, Sr. .................... 98/115.1

FOREIGN PATENT DOCUMENTS 591169 8/1947 United Kingdom ............ 98/115.1
2004056 3/1979 United Kingdom ............ 98/115.4

*Primary Examiner*—Harold Joyce
*Attorney, Agent, or Firm*—Fetherstonhaugh & Co.

[57] ABSTRACT

An exhaust extraction system for use in a welding work station is provided which operates to exhaust the noxious fumes from the welding site when the welding operation is being carried out and for a limited period thereafter. A supply of an inert shielding gas is delivered under pressure to both the welding side and the damper control mechanism. In response to changes in pressure in the supply line of the inert shielding gas, the damper control mechanism is operable to close the damper when the welding machine is deactivated and to open the damper when the welding machine is activated.

4 Claims, 2 Drawing Sheets

EXHAUST EXTRACTION SYSTEM FOR WELDING SITE

This invention relates to exhaust extraction systems for use in a welding work station. In particular, this invention relates to an exhaust extraction system which operates to exhaust the noxious fumes from a welding site only when the welding operation is being carried out and for a limited time period thereafter.

BACKGROUND OF INVENTION

It is common to provide an exhaust extraction system for extracting noxious fumes from one or more welding sites. The exhaust fumes are conveyed from each work site through a primary duct, the primary ducts are connected to a secondary duct and an extraction fan extracts the noxious fumes from the secondary duct and expels the fumes from the building in which the work sites are located. While it is common to provide a damper in each of the primary ducts, the damper control mechanism can be a manually operable mechanism which is designed to be operated by the welder. If the damper is not closed when the welding machine is not in operation, air will be withdrawn from the work site through the duct system so as to be expelled from the building. The air which is expelled must be replaced by drawing any air from the exterior of the building. This fresh air which is drawn into the building must then either be heated or cooled to maintain the required working temperature within the building, and as a result a considerable amount of energy may be used to heat or cool the replacement air which is required to replace uncontaminated air which is expelled unnecessarily through the extraction system while the manually controlled damper mechanism so designed to reduce this problem, in practice, welders usually open the damper when they begin their working day and leave the damper open until the end of their working day. In many instances, the hand welding machine is actually operating for less than 50 per cent of a working shift.

SUMMARY OF INVENTION

We have found that it is possible to overcome the difficulties of the prior art by making the damper the slave of the welding machine so that it will open automatically when welding begins and will close automatically shortly after welding ceases.

It is an object of the present invention to provide a simple and inexpensive control system which will permit the damper which is located in the primary duct of an exhaust extraction system to be the slave of a welding machine so that it will open when the welding machine is operating and will close after the welding machine ceases to operate.

According to one aspect of the present invention, there is provided in an exhaust extraction system for removing noxious fumes from a welding site which is located in welding work station, an exhaust duct through which the fumes are vented to atmosphere, a damper in the exhaust duct having a damper control mechanism that is operable to displace the damper to and fro between an open and a closed position to open and close the exhaust duct, a welding machine and a supply of pressurized inert shielding gas delivered under pressure through a supply lie to the welding site and to said damper control mechanism, wherein the pressure in the supply line changes when the welding machine is activated and deactivated, and the supply line communicates with said damper control mechanism such that the change in pressure in the supply line that occurs when the welding machine is activated serves to open the damper and the change in pressure in the supply line that occurs when the welding machine is deactivated serves to close the damper, whereby the exhaust duct will be open when the welding machine is activated to perform a welding operation which generates noxious fumes and closed when the welding machine is deactivated.

According to a further aspect of the present invention, there is provided in an exhaust extraction system for removing noxious fumes from each of a plurality of welding sites which are located in welding workstations, a plurality of primary exhaust ducts, each leading from a welding site, through which the fumes are discharged into a secondary duct through which the fumes are vented to atmosphere, a damper in each primary exhaust duct, a damper control mechanism associated with each damper, each damper control mechanism being operable to displace its associated damper to and fro between an open and a closed position to open and close the primary exhaust duct in which it is located, a welding machine located at each welding site, and a supply of pressurized inert shielding gas delivered under pressure to each welding machine and each damper control mechanism by a supply line, the pressure in each supply line changing when the welding machine to which it is supplied is activated and deactivated, the supply lines each communicating with the associated damper control mechanism such that the change in pressure in the supply line that occurs when the associated welding machine is activated serves to open the associated damper, and the change in pressure in the supply line that occurs when the associated welding machine is deactivated serves to close the exhaust damper, whereby only the exhaust ducts that extend from work sites in which a welding machine is operating will be open to communicate with the secondary duct.

BRIEF DESCRIPTION OF THE DRAWINGS

The invention will be more clearly understood after a reference to the following detailed specification read in conjunction with the drawings wherein;

With reference to FIG. 1 of the drawings, the reference numeral 10 refers generally to an exhaust extraction system constructed in accordance with an embodiment of the present invention. The exhaust extraction system includes a primary exhaust duct 12 which has an intake end 14 located in a welding site 16 of a welding work station 18. A damper plate 20 is mounted in the duct 12 for movement about a shaft 22 between the open position shown in FIG. 1 and a closed position in which the damper pipe 20 extends at right angles to the position shown in FIG. 1. A damper control mechanism 24 serves to move the damper plate 20 between the open and closed position. The damper control mechanism 24 includes a pneumatic cylinder 26 which has a movable ram 28 which is connected to the lever arm 30 which projects radially from a shaft 22. A flow control device 32 forms the communication between the pneumatic cylinder 26 and a supply line 34. The flow control mechanism 32 is designed to permit rapid extension of the extensible ram 28 while permitting gradual closing. This type of flow control mechanism is well known and will not therefore be described in detail.

Figure 1:
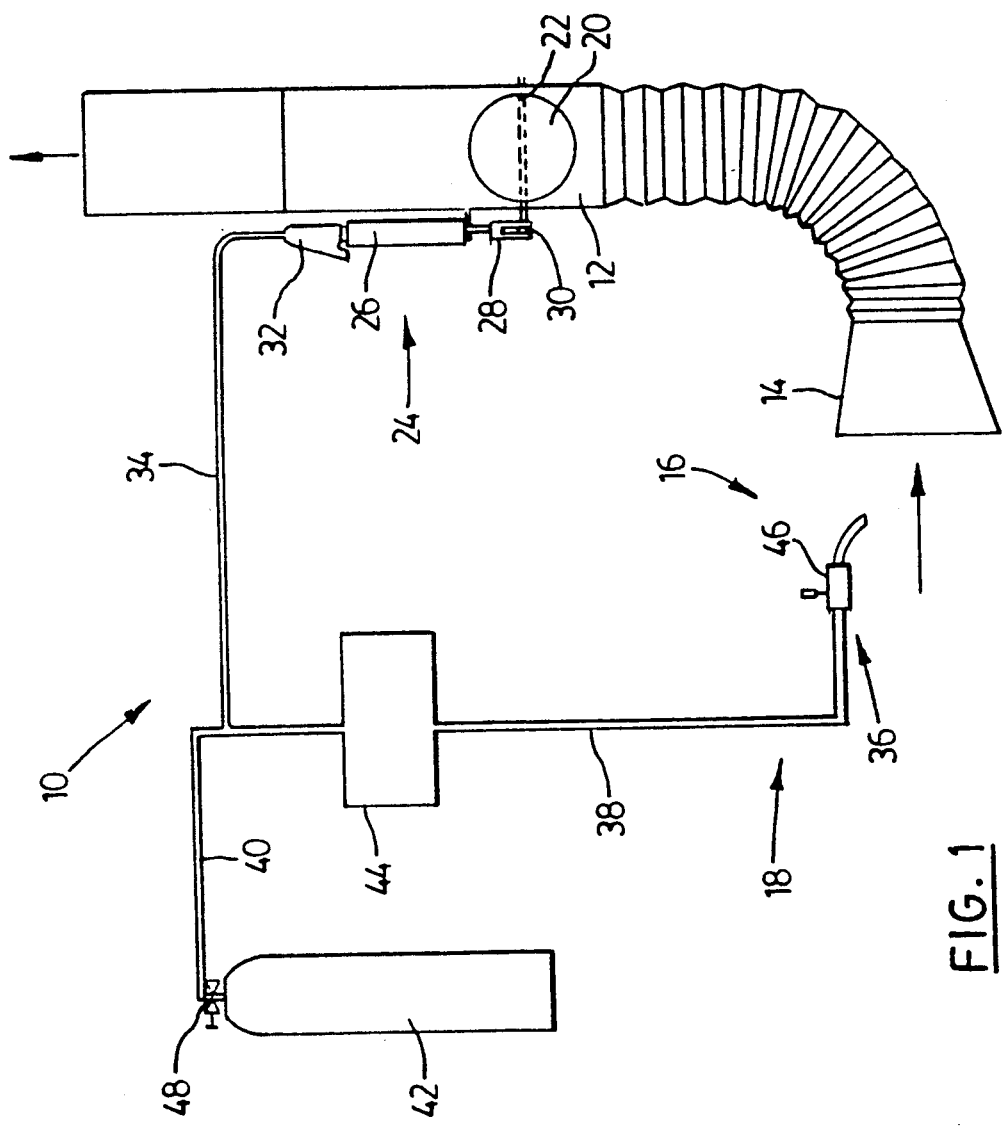
FIG. 1 is a diagram illustrating the single point exhaust extraction system constructed in accordance with an embodiment of the present invention.

The welding machine 36 which is located at the welding site 16 is connected through a tube 38 to a supply line 40 which leads from a cylinder 42 which contains an inert shielding gas. A wire feeder 44 may also be provided which serves to feed wire through the conduit 38 to the welding gun 46. A flow control valve 48 is provided at the output from the gas cylinder 42. In use, when the welding gun is activated, the inert shielding gas is discharged from the welding gun at the welding site. This causes the pressure in the conduit 38 and conduit 40 to drop. As a result, the pressure in the conduit 34 will also drop. When the pressure in the line 34 drops, the return spring which incorporated into the pneumatic cylinder 26 will retract the ram 28 rapidly thereby causing the baffle 20 to move rapidly to the open position. When the welding gun is deactivated, the inert shielding gas will no longer be discharged; and consequently, the pressure in the conduit 38, conduit 40 and conduit 34 will gradually increase and this increase will be applied through the flow control timing device 32 to the pneumatic cylinder 26 so as to gradually extend the ram 28 to move the baffle 20 to the closed position. The gradual closing of the damper allows sufficient time to remove all of the noxious fumes from the work site before the extraction system is totally deactivated.

From the foregoing, it will be apparent that the damper control mechanism is operable in response to a change in a parameter of the operating system of the welding gun; namely, the change in pressure in the inert gas supply lines which results when the operating system is activated and deactivated. As a result, the damper in the extraction duct is in effect the slave of the welding gun.

Figure 2:
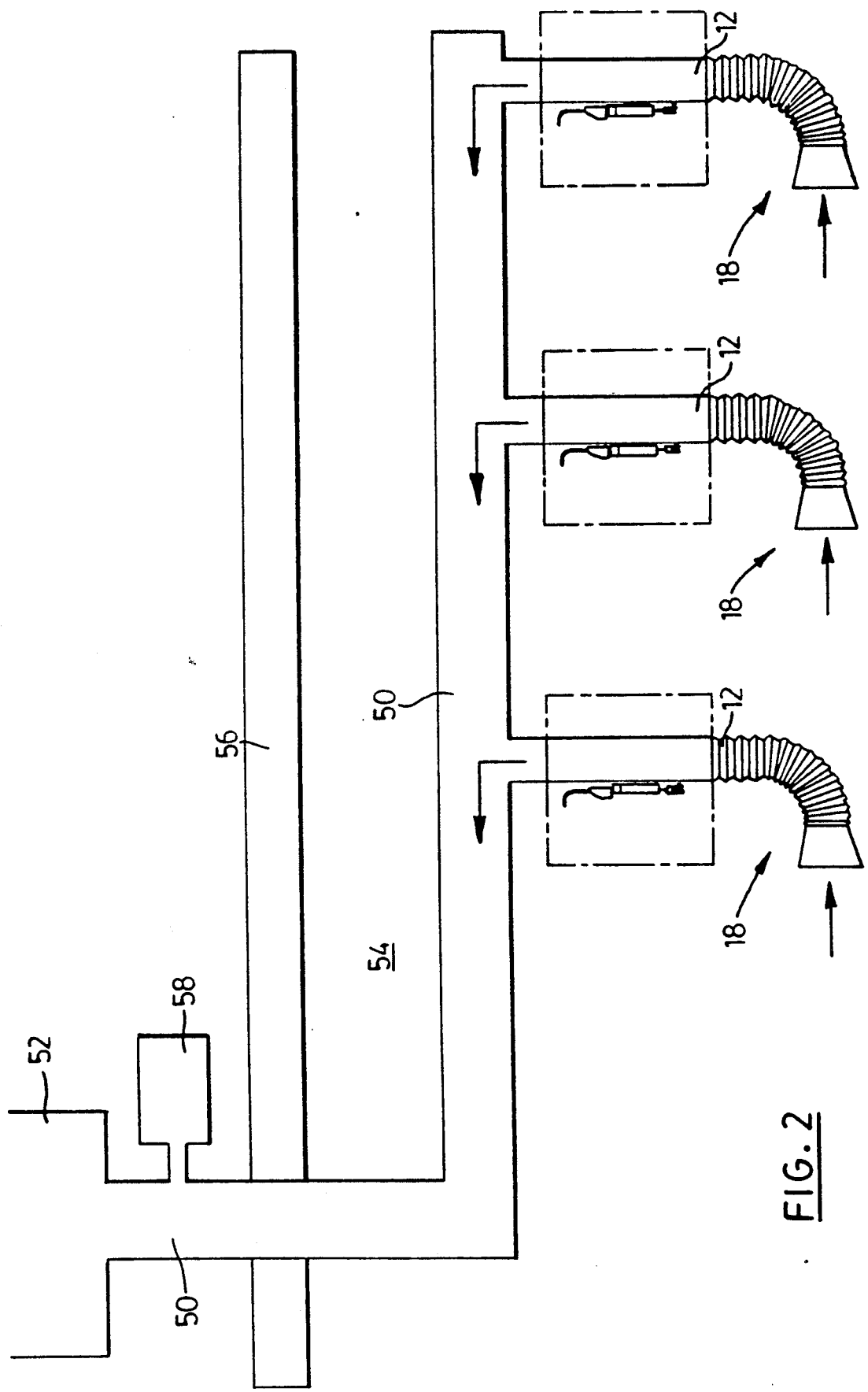
FIG. 2 is a diagram illustrating a multi-point exhaust extraction system constructed in accordance with a further embodiment of the present invention.

As shown in FIG. 2 of the drawing, the present invention is particularly suitable for use in a system in which a plurality of welding stations 18 are provided, each of which has a primary conduit 12 which communicates with a secondary conduit 50 which is connected to an extractor fan 52 which is located on the exterior of the enclosure 54. In a typical installation, the extractor fan 52 is located above or outside the roof or wall 56 of the building in which the welding stations are located. A relief valve 58 is provided which communicates with the secondary conduit 50 so that if all of the baffles in all of the ducts 12 are closed, the extractor 52 can draw air through the relief valve 58 and thereby avoid the need to withdraw any air whatsoever from the enclosure 54. Alternatively, the relief valve 58 can be located within the enclosure 54 and may be strategically located in order to provide for general ventilation. In each welding station a separate gas cylinder containing inert shielding gas will be provided for each welding gun in the manner shown in FIG. 1 with the result that the damper in each duct 12 will open and close in response to the operation of the welding gun with which its duct 12 is associated in the welding station. As a result, the noxious fumes generated by the welding operation will be withdrawn from each welding site while the welding operation is being carried out; however, the damper located in each duct will move toward the closed position when the welding gun with which it is associated is deactivated with the result that the extractor will only extract air from the active welding sites while the welding gun is actively engaged in a welding operation and for a very short period of time thereafter.

The present invention can substantially reduce the volume of the air which is withdrawn from the enclosure 54 in the course of a normal working day and this reduction will reduce the cost involved in heating or cooling the replacement air which is provided for the purposes of replacing the air which is removed during the operation of the exhaust extraction system.

These and other advantage of the present invention will apparent by those skilled in the art.

We claim:

1. In an exhaust extraction system for removing noxious fumes from a welding site which is located in a welding workstation:
   a. an exhaust duct through which the fumes are vented to atmosphere;
   b. a damper in the exhaust duct having a damper control mechanism that is operable to displace the damper to and from between an open position and a closed position to open and close the exhaust duct;
   c. a welding machine; and
   d. a supply of pressurized inert shielding gas delivered under pressure through a supply line to the welding site and to said damper control mechanism, wherein the pressure in the supply line changes when the welding machine is activated and deactivated, said supply line communicating with said damper control mechanism such that the change in pressure in the supply line that occurs when the welding machine is activated serves to open the damper and the change in pressure in the supply line that occurs when the welding machine is deactivated serves to close the damper;
   whereby the exhaust duct will be open when the welding machine is activated to perform a welding position which generates noxious fumes and closed when the welding machine is deactivated.

2. An exhaust extraction system as claimed in claim 1 wherein the damper control mechanism is operable in response to changes in pressure in the supply line to effect a rapid opening of the exhaust duct when the welding machine is activated and to effect a gradual closing of the exhaust duct when the welding machine is deactivated.

3. In an exhaust extraction system for removing noxious fumes from each of a plurality of welding sites which are located in welding workstations:
   a. a plurality of primary exhaust ducts, each leading from a welding site, through which the fumes are discharged into a secondary duct through which the fumes are vented to atmosphere;
   b. a damper in each primary exhaust duct;
   c. a damper control mechanism associated with each damper, each damper control mechanism being operable to displace its associated damper to and from between an open position and a closed position to open and close the primary exhaust duct in which it is located;
   d. a welding machine located at each welding site;
   e. a supply of pressurized inert shielding gas delivered under pressure to each welding machine and each damper control mechanism by a supply line, the pressure in each supply line changing when the welding machine to which it is supplied is activated and deactivated, said supply lines each communicating with the associated damper control mechanism such that the change in pressure in the supply line that occurs when the associated welding machine is activated serves to open the associated damper and the change in pressure in the supply line that occurs when the associated welding machine is deactivated serves to close the associated damper;

whereby only the exhaust ducts that extend from work sites in which a welding machine is operating will be open to communicate with the secondary duct.

4. An exhaust extraction system as claimed in claim 3 wherein each damper control mechanism is operable in response to changes in pressure in the supply line to effect a rapid opening of its associated changes when the associated welding machine is activated and to effect a gradual closing of its associated damper when the welding machine is deactivated.

* * * * *